United States Patent [19]

Carter et al.

[11] 4,093,197
[45] June 6, 1978

[54] LEAF SPRING SUSPENSION

[75] Inventors: John W. Carter, Bettendorf, Iowa; L. John Koutsky, Milan, Ill.

[73] Assignee: Sears Manufacturing Company, Davenport, Iowa

[21] Appl. No.: 778,019

[22] Filed: Mar. 16, 1977

[51] Int. Cl.² .............................................. F16F 1/22
[52] U.S. Cl. ...................................... 267/131; 267/41
[58] Field of Search ............. 267/36 A, 41, 48, 54 R, 267/131, 165

[56] References Cited

U.S. PATENT DOCUMENTS

| | | | |
|---|---|---|---|
| 1,140,271 | 5/1915 | Le Cato | 267/165 |
| 3,203,661 | 8/1965 | Brendel | 267/41 X |

FOREIGN PATENT DOCUMENTS 1,916,403  10/1970  Germany .............................. 267/131

Primary Examiner—Duane A. Reger
Attorney, Agent, or Firm—Henderson, Strom, Sturm, Cepican & Fix

[57] ABSTRACT

A pair of leaf plate members. A seat support structure includes upper and lower housing members with scissors linkage members extending therebetween, one leaf plate member being attached to the scissors linkage members and the other being attached to the lower housing. The leaf plate members abut at a pivot area. Adjacent the pivot area, portions of the leaf plate members form a weight adjustment control.

10 Claims, 3 Drawing Figures

LEAF SPRING SUSPENSION

BACKGROUND OF THE INVENTION

This invention relates to vehicle seat support structures and particularly to the suspension and weight adjustment mechanisms employed in such structures. Seat support structures commonly employ an upper housing member upon which a seat is mounted, a lower housing member which is mounted upon the vehicle and linkage members interconnecting the housing members. The suspension generally is disposed between the housing members, and the weight adjustment mechanism is coupled to the suspension and supported by the housing.

Commonly a conical coil spring, extending between the housing members, is employed for suspension. The weight adjustment structure, which adapts the seat to the weight of the vehicle operator such that the seat is disposed at the mid-point or half-stroke position of the suspension vertical travel when the operator has positioned himself therein, normally employs a plate abutting the top of the coil spring. A post extends downwardly fro the upper housing member, and the plate and a large gear are disposed thereon. A rotatable shaft having a drive gear at one end and a control knob at the opposite end, is supported by the upper housing member. The drive gear engages the large gear and causes it to move aong the length of the post, thereby enabling the pressure of the plate upon the spring to be varied.

From the foregoing it can be seen that, presently, suspension and weight adjustment structures are generally separate and distinct. Also, weight adjustment structures tend to be somewhat complex.

SUMMARY OF THE INVENTION

A pair of leaf spring members are incorporated into a support structure for a vehicle seat. One leaf spring member is attached to the lower housing member of the support structure and extends upwardly therefrom. The second leaf spring member is attached to the linkage disposed between the upper and lower housing members and extends downwardly therefrom toward the first leaf spring member. The leaf spring members abut at a pivot area and then extend beyond the pivot area, bending away from each other, the first leaf spring member turning downward and the second upward. The leaf spring members are interconnected at their extended terminating ends by an adjustment bolt, and a weight adjustment control level is mounted thereon.

It is an object of this invention to provide a suspension for a vehicle seat having a greatly enhanced deflection or softness.

It is another object of this invention to provide a suspension for a vehicle seat having a constant stress uniformly distributed through the parts thereof, thereby to achieve the aforementioned object and also the reduction of wearing.

Still another object of this invention is to provide for the limitation of fretting or brinelling in a suspension for a vehicle seat.

Yet another object of this invention is to supply a structure for a vehicle seat whereby the functions of suspension and weight adjustment are more effectively and efficiently provided for.

A further object of this invention is to provide a structure for a vehicle seat which is economical to manufacture and maintain yet capable of attaining the aforementioned objects.

These objects and other features and advantages of the leaf spring suspension of this invention will become readily apparent upon referring to the following description, when taken in conjunction with the appended drawing.

BRIEF DESCRIPTION OF THE DRAWING

The leaf spring suspension of this invention is illustrated in the drawing wherein.

DESCRIPTION OF THE PREFERRED EMBODIMENT

Figure 1:
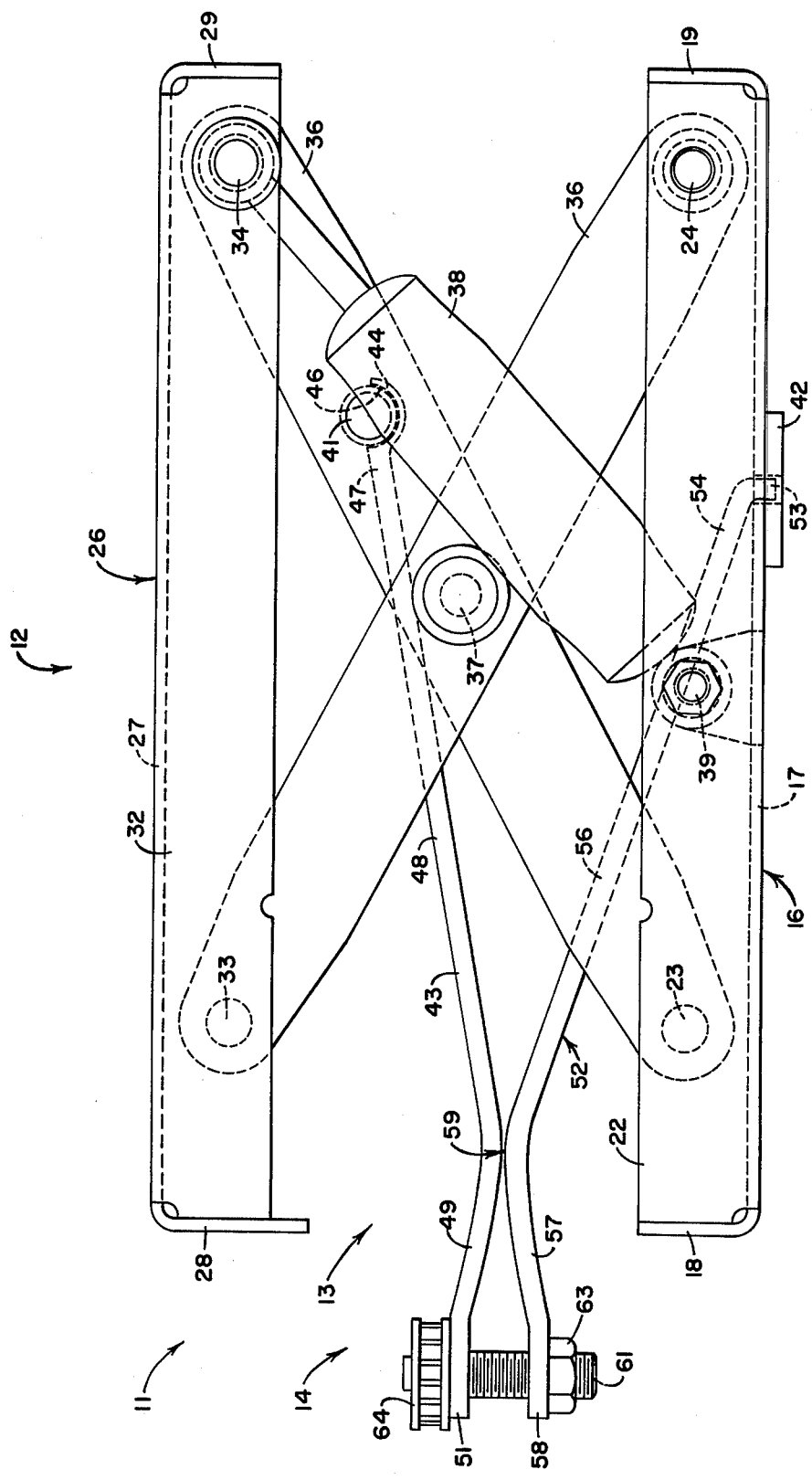
FIG. 1 is a side elevational view of the leaf spring suspension incorporated into a support for a vehicle seat.

The leaf spring suspension of this invention is indicated generally at 11 in FIG. 1 incorporated into a support structure 12 for a vehicle seat (not shown). The leaf spring suspension 11 more particularly includes a suspension portion 13 and a weight adjustment portion 14.

Figure 2:
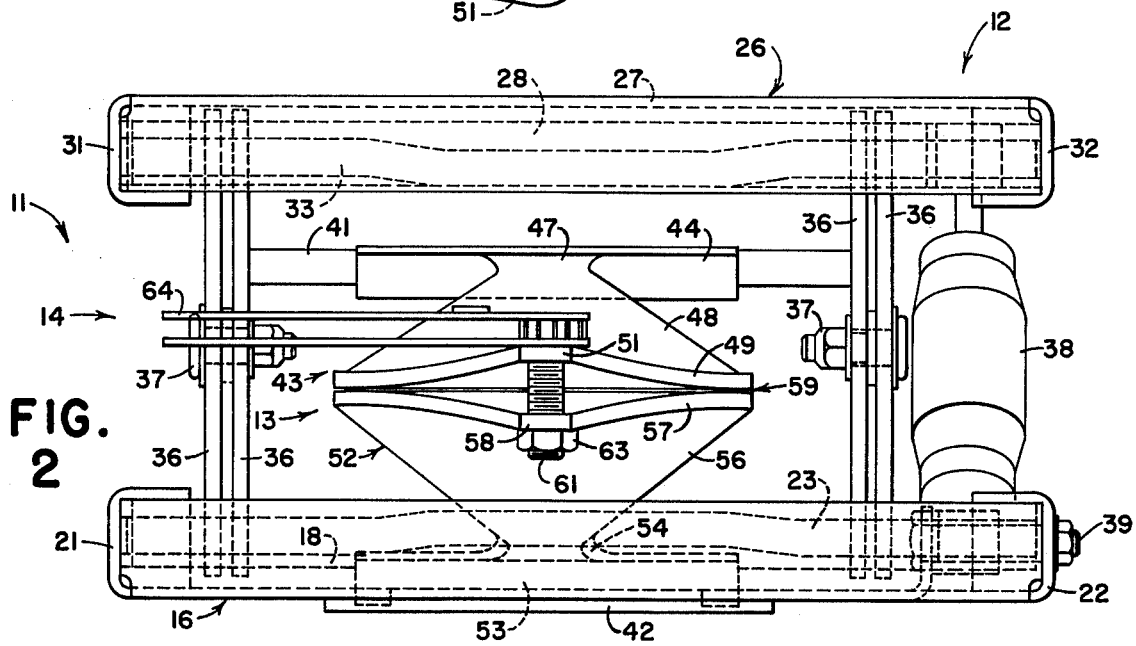
FIG. 2 is a reduced, front elevational view illustrating the weight adjustment portion of the leaf spring suspension.

The support structure 12 includes a lower housing member 16 (FIGS. 1 and 2). The member 16 has a substantially rectangular, flat bottom plate 17 and front, rear, right side and left side flanges 18, 19, 21, 22. The flanges 18, 19, 21, 22 are joined normal to, and about the periphery of, the plate 17, and extend upwardly therefrom. Front and rear transverse bar members 23, 24 extend between the right and left side flanges 21, 22, adjacent the front and rear flanges 19, 21 respectively. The lower housing member 16 may be directly attached to a vehicle (not shown) or may have additional structures (not shown) affixed thereto, such as various types of support plates or adjustment mechanisms, which interconnect the member 16 with the vehicle (not shown).

The support structure 12 also includes an upper housing member 26. The member 26 has a rectangular, flat top plate 27 and front, rear, right side and left side flanges 28, 29, 31, 32 joined normal to, and depending from, the periphery of the plate 27. Front and rear transverse bars 33, 34 extend between side flanges 31, 32. The seat portion (not shown) of a vehicle seat is attached, either directly or through further structures (not shown), to the upper housing member 26.

Figure 3:
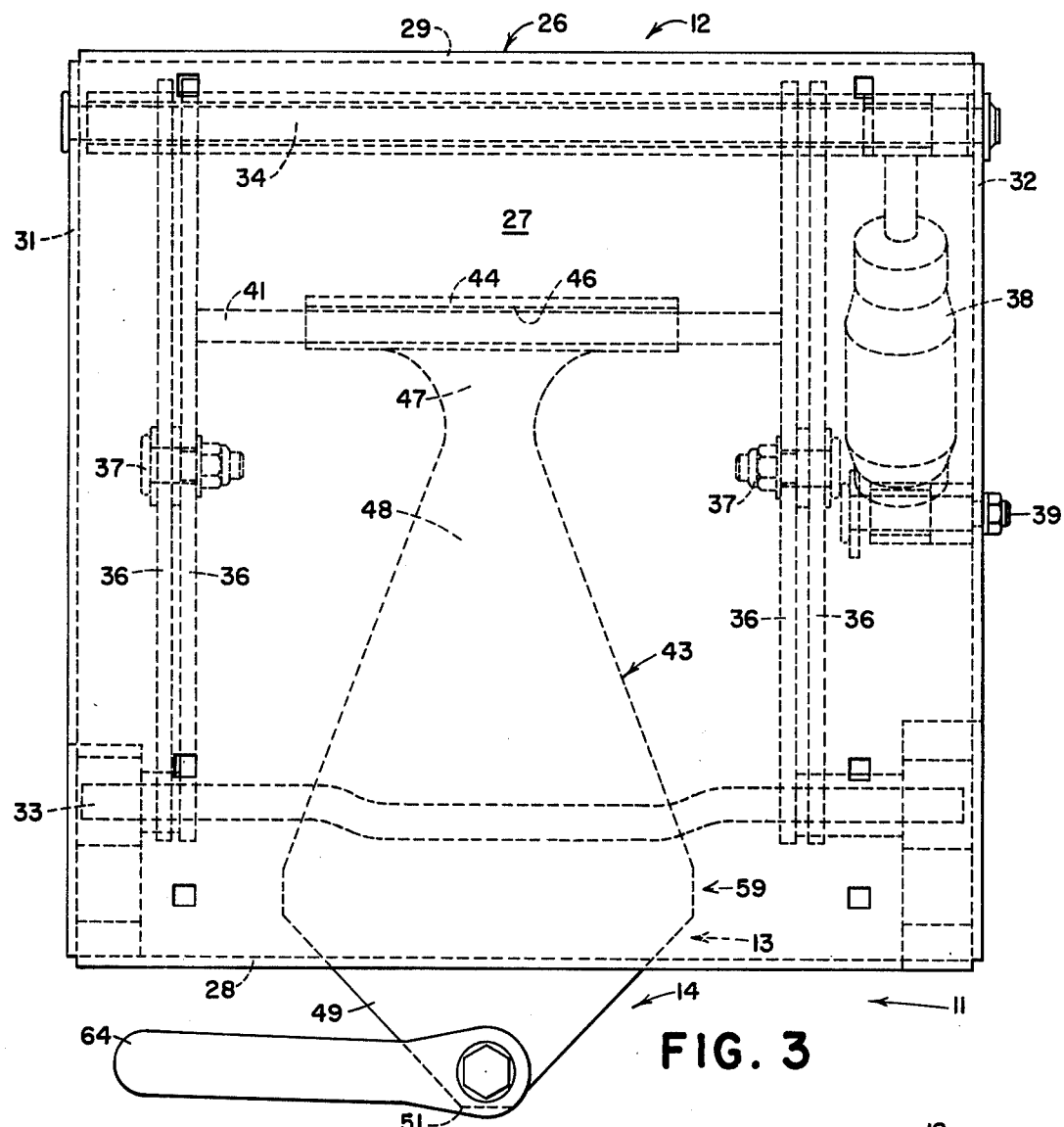
FIG. 3 is a reduced, top plan view of the leaf spring suspension incorporated into the support structure for the seat.

The support structure 12 also includes a plurality of scissors linkage members 36 (FIGS. 2 and 3). The members 36 are elongated and flat and are disposed in parallel planes which are normal to the plates 17, 27. The members 36 are disposed in transversely spaced pairs, and the members 36 of each pair are pivotally joined at an intermediate attachment point 37. The inner member 36 of each pair is pivotally affixed at one end to the rear transverse bar 34 and at the opposite end to the front transverse bar 23. The outer member 36 of each pair is pivotally attached to the front bar 33 and the rear bar 24. A shock absorber 38 is pivotally attached at the upper end thereof to the rear bar 34 and at the lower end thereof to the side flange 22 at an intermediate attachment point 39.

The suspension portion 13 of the leaf spring suspension 11 includes an upper bar 41 and a lower blank member 42. The bar 41 extends between the two inside scissors linkage members 36. The bar 41 is attached at points on the inside members 36 one-third of the way along the lengths thereof away from the ends disposed at bar 34 and toward the ends disposed at bar 23. The blank 42 is flat and elongated and is affixed to the bottom, or exterior facing, side of the bottom plate 17. The bar 41 and blank 42 are oriented parallel to the plates 17, 27 and normal to the sides 21, 22, 31, 32. The blank 42 is disposed between the attachment point 39 and the rear transverse bar 24, when viewed from the side as in FIG. 1.

The suspension portion 13 includes an upper leaf spring member 43 (FIGS. 1 and 3). At the interior end of the member 43 is an elongated, transverse member 44 having a longitudinal channel 46 formed in the upper side thereof. The member 44 engages the upper bar 41, which bar 41 fits within the channel 46. The leaf spring member 43 extends downwardly and away from the bar 41, having a narrowing neck portion 47 extending from transverse member 44. The neck portion 47 is contiguous with a flat, widening first pie-shaped portion 48. The portion 48 joins a shorter, tapering second pie-shaped portion 49, which portion 49 turns upwardly, projects beyond the space enclosed by the housing members 16, 26, and terminates in an extended end 51.

The suspension portion 13 also includes a lower leaf spring member 52. At the interior end of the member 52 is a transverse flange 53. The flange 53 extends downwardly, through the bottom plate 17 and into the lower blank 42. The leaf spring member 52 extends upwardly and away from the blank 42, having a narrowing neck portion 54 extending from the transverse flange 53. The neck portion 54 joins a flat, widening first pie-shaped portion 56. The portion 56 joins a shorter, tapering second pie-shaped portion 57. The second portion 57 turns downward, projecting beyond the space enclosed by the housing members 16, 26, and terminates in an extended end 58.

The upper and lower leaf spring members 43, 52 abut along a transverse pivot area 59. A plastic pad or sheet (not shown) may be disposed between the members 43, 52 along the pivot area 59. The weight adjustment portion 14 further adds a threaded adjustment bolt or rod 61 which extends downwardly through the second portions 48, 57 adjacent the extended ends 51, 58 and is secured thereto as with a nut 63 fixed to the underside of the portion 57. A ratchet lever 64 is attached to the upper end of the adjustment bolt 61.

When the leaf spring suspension 11 is employed with a support structure 12 for a vehicle seat, the leaf spring members 43, 52 flex to allow the vertical distance between the housing members 16, 26 to vary. The vehicle seat is thereby allowed travel vertically with respect to the vehicle to provide a smooth ride for the vehicle operator. The members 43, 52 press against each other and pivot with respect to each other about the pivot area 59. Downward motion of the seat and upper housing member 26 is transferred via the inside linkage members 36 through the bar 41. Pressure upon the transverse member 44 is transferred through the neck portion 47 to the first and second portions 48, 49. The first portion 48 bends downward, and the second portion 49, pressing against the ratchet lever 64, attempts to bend upward, about the pivot area 59.

The upper leaf spring 43 presses down upon the lower leaf spring 52 at the pivot area 59. The first portion 56 is forced to bend downward about the transverse flange 53, and the second portion 57 presses against the nut 63. The leaf spring members 43, 52 resist being flattened. The first portion 56 bends upwardly about the flange 53, and the second portion 57 presses against nut 63, thereby causing upward pressure against the leaf spring 43 at the pivot area 59. The second portion 49 presses against the ratchet lever 64, and the first portion 48 bends upward about the pivot area 59, upward motion being imparted to the upper housing member 26 through the bar 41.

Adjustment for the weight of the vehicle operator is accomplished by operation of the ratchet lever 64. The vertical distance between the extended, terminal ends 51, 58 is varied by movement of the adjustment bolt 61. The smaller the separation of the ends 51, 58, the greater is the tension upon the second portions 49, 57 to bend further about the pivot area 59. The first portions 48, 56 in turn place greater pressure upward upon the bar 41 and downward upon the blank 42, respectively. The suspension 11 thereby is adjustable such that the upper housing member 26, and therefore the seat, is at the midpoint of its vertical travel range when the vehicle operator positions himself in the seat.

The first portions 48, 56 and second portions 49, 57 of the leaf spring members 43, 52 perform both suspension and weight adjustment functions, although the first portions 48, 56 are engaged primarily in the former function and the second portions 49, 57 in the latter. A great economy of parts is obtained, and the suspension and weight adjustment functions are more effectively and efficiently provided for. The curved surfaces of the leaf spring members 43, 52 meeting at the pivot area 59 have reduced wear in that the pivot area has a longitudinal, as well as a transverse, dimension, and therefore wearing forces are not constantly concentrated upon the surface of either of the members 43, 52 along a single transverse axis. Fretting or brinnelling of the surfaces in the pivot area 59 are further limited by employment of the plastic pad or sheet between the members 43, 52. The conformation of the leaf spring members 43, 52 results in stresses being more uniformly distributed throughout, thereby reducing wear upon the members 43, 52. The conformation of the members 43, 52 results in the members 43, 52 having a constant or linear rate, and also in the suspension 11 having much greater deflection or softness. Stiffness of the seat is further reduced by attachment of the suspension 11 to the scissors linkage members 36 rather than to the upper housing member 26.

Although a preferred embodiment of the leaf spring suspension has been disclosed herein, it is to be remembered that various modifications and alternate constructions can be made thereto without departing from the full scope of the invention, as defined in the appended claims.

We claim:

1. A suspension for use with a support structure for a seat, the support structure having upper and lower halves interconnected and variably spaced apart by movable linkage members, the seat being attached to the upper half, said suspension comprising:

first means for suspension having a first connecting end operably coupled to the upper half of the support structure and having an opposite, first terminating end, said first suspension means being bent to form a first pivot area therein between said first connecting and terminating ends, said first means having a bar member and a transverse member, said bar member being attached between two linkage members, said transverse member being joined to said first means at said first connecting end, said transverse member engaging said bar member;

second means for suspension having a second connecting end attached to the lower half of the support structure and having an opposite, second terminating end, said second suspension means being bent to form a second pivot area therein between said second connecting and terminating ends; and control means for weight adjustment extending between said terminating ends to connect said first and second means, said first and second pivot areas abutting, said first means being rockable upon said second means at said pivot areas.

2. A suspension as described in claim 1 and further wherein said bar member is attached to the linkage members one-third of the way down the lengths thereof from the point of attachment of the linkage members to the upper half toward the point of attachment of the linkage members to the lower half.

3. A suspension as described in claim 1 and further wherein said bar member is removably and rotatably received by said transverse member.

4. A suspension as described in claim 1 and further wherein said first means includes first and second leaf portions joined at said first pivot area, said first leaf portion having said first connecting end joined thereto, said second leaf portion having said first terminating end joined thereto, said first and second leaf portions tapering and extending away from said first pivot area toward said first connecting and terminating ends, said first means including a neck portion interconnecting said first leaf portion and said transverse member, said neck portion tapering to join said first leaf portion.

5. A suspension for use with a support structure for a seat, the support structure having upper and lower halves interconnected by movable linkage members to permit variation of the spacing of the halves, the seat being attached to the upper half, said suspension comprising:

first means for suspension having a first connecting end operably coupled to the upper half of the support structure and having an opposite, first terminating end, said first suspension means being bent to form a first pivot area therein between said first connecting and terminating ends, said first means including first and second leaf portions joined at said first pivot area, said first leaf portion having said first connecting end joined thereto, said second leaf portion having said first terminating end joined thereto, said first and second leaf portions tapering and extending away from said first pivot area toward said first connecting and terminating ends, said first means having a bar member and a transverse member, said bar member being attached between two linkage members, said transverse member being joined to said first means at said first connecting end, said transverse member engaging said bar member;

second means for suspension having a second connecting end attached to the lower half of the support structure and having an opposite, second terminating end, said second suspension means being bent to form a second pivot area therein between said second connecting and terminating ends, said second means including third and fourth leaf portions joined at said second pivot area, said third leaf portion having said second connecting end joined thereto, said fourth leaf portion having said second terminating end joined thereto, said third and fourth leaf portions tapering and extending away from said second pivot area toward said second connecting and terminating ends; and control means for weight adjustment extending between said terminating ends to connect said first and second means, said first and second pivot areas abutting, said first means being rockable upon said second means at said pivot areas.

6. A suspension as described in claim 5 and further wherein said control means includes a ratchet lever means and an adjustment bolt, said adjustment bolt being attached through said second and fourth leaf portions adjacent said terminating ends, said ratchet lever means being operable to rotate said adjustment bolt, the distance between said terminating ends being variable upon rotation of said adjustment bolt, whereby weight adjustment is effected.

7. A suspension as described in claim 5 and further wherein said bar member is attached to the linkage members one-third of the way down the lengths thereof from the point of attachment of the linkage members to the upper half toward the point of attachment of the linkage members to the lower half.

8. A suspension as described in claim 5 and further wherein said bar member is removably and rotatably received by said transverse member.

9. A suspension as described in claim 5 and further wherein said first means includes a neck portion interconnecting said first leaf portion and said transverse member, said neck portion tapering to join said first leaf portion.

10. A suspension as described in claim 5 and further wherein said second means includes a plate member and a transverse flange, said plate member being affixed to the lower half, said transverse flange being attached at said second connecting end, said transverse flange extending through the lower half and into said plate member.

* * * * *